(12) United States Patent
Hansel et al.

(10) Patent No.: US 12,354,050 B2
(45) Date of Patent: Jul. 8, 2025

(54) SOLAR MODULE CRATE TRANSPORT AND MONITORING STRUCTURE

(71) Applicant: Terabase Energy, Inc., Berkeley, CA (US)

(72) Inventors: Adam Hansel, Davis, CA (US); Allan Daly, Albany, CA (US); Peter May-Ostendorp, Durango, CO (US); Steven Malinoski, Santee, CA (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 0 days.

(21) Appl. No.: 17/903,844

(22) Filed: Sep. 6, 2022

(65) Prior Publication Data

US 2024/0078501 A1  Mar. 7, 2024

(51) Int. Cl.
*G06Q 10/0833* (2023.01)
*B65D 19/00* (2006.01)
*B65D 19/44* (2006.01)
*B65D 85/30* (2006.01)
(Continued)

(52) U.S. Cl.
CPC ..... *G06Q 10/0833* (2013.01); *B65D 19/0093* (2013.01); *B65D 19/44* (2013.01); *B65D 85/30* (2013.01); *G06K 7/10366* (2013.01); *G06K 19/0723* (2013.01); *B65D 2519/00273* (2013.01); *B65D 2519/00293* (2013.01); *B65D 2519/00323* (2013.01); *B65D 2519/00815* (2013.01)

(58) Field of Classification Search
CPC ............ G06Q 10/0833; B65D 19/0093; B65D 19/44; B65D 85/30; B65D 2519/00273; B65D 2519/00293; B65D 2519/00323; G06K 7/10366
See application file for complete search history.

(56) References Cited

U.S. PATENT DOCUMENTS

| | | | | |
|---|---|---|---|---|
| 6,408,770 | B1 * | 6/2002 | Mason | B65D 19/38 108/54.1 |
| 2005/0241549 | A1 * | 11/2005 | Gordon | B65D 19/0016 108/51.3 |

(Continued)

FOREIGN PATENT DOCUMENTS

EP  3885282 A1 * 9/2021 ............. B65D 19/44

OTHER PUBLICATIONS

Stefano Cii, Solar Wireless Sensor Nodes for Condition Monitoring of Freight Trains, 2020, p. 3995-3997 (Year: 2020).*

(Continued)

*Primary Examiner* — Ibrahim N El-Bathy
(74) *Attorney, Agent, or Firm* — Michael North

(57) ABSTRACT

A solar module crate transport is described that securely moves a solar module crate within a large-scale solar system. The solar module crate transport comprises an angled base, at least three vertical support structures, at least one vehicle receptacle and at least one monitoring device. The at least one monitoring device may provide a variety of monitoring functionality that allows remote monitoring of an installation location within the large-scale solar system. This monitoring allows visibility into resources, including solar modules, and personnel at an installation location within the large-scale solar system.

22 Claims, 6 Drawing Sheets

(51) Int. Cl.
*G06K 7/10* (2006.01)
*G06K 19/07* (2006.01)

(56) References Cited

U.S. PATENT DOCUMENTS

| | | | | |
|---|---|---|---|---|
| 2006/0071774 A1* | 4/2006 | Brown | ............ | G06Q 30/02 340/522 |
| 2007/0044979 A1* | 3/2007 | Popp | ............ | G01J 5/0014 169/56 |
| 2009/0015400 A1* | 1/2009 | Breed | ............ | G07C 9/28 340/539.22 |
| 2010/0236598 A1* | 9/2010 | Roy | ............ | H01L 31/048 156/60 |
| 2012/0187895 A1* | 7/2012 | Hsieh | ............ | G06F 1/263 320/101 |
| 2020/0004995 A1* | 1/2020 | Kawaguchi | ...... | G06K 19/07749 |
| 2021/0205997 A1* | 7/2021 | Zhou | ............ | H02S 10/00 |

OTHER PUBLICATIONS

International Search Report and Written Opinion of the International Searching Authority mailed Jul. 27, 2023 in related PCT application No. PCT/US23/19873, (10 pgs).

\* cited by examiner

SOLAR MODULE CRATE TRANSPORT AND MONITORING STRUCTURE

TECHNICAL FIELD

The present disclosure relates generally to various embodiments of transport structures that securely support solar module crates to enable safe movement around a large-scale solar system and removal of the solar modules from the transport structure for subsequent installation. More particularly, the present disclosure relates to embodiments of transport structures that provide angled bottom support rails to secure solar modules and a plurality of different monitoring features to enhance the installation efficiency and reliability of the solar modules.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently move and monitor solar modules around a very large site during the construction process.

Large-scale solar panel systems typically include thousands of solar modules that are located across a multi-acre terrain and that are electrically coupled to provide a source of energy. These large-scale systems are oftentimes located in remote areas and require a significant investment in materials, resources and labor in their installation and design. The movement and monitoring of materials, such as solar modules, for these installations can be problematic and inconsistent. Solar modules may fall from a transport, sit for an extended period of time at a particular location, damaged during removal from the transport or damaged from stress and/or torque pressure during movement across the site. The ability to securely move solar module crates and other components to an installation location, and safely remove this material from a transport structure, would drastically improve the installation process.

The construction of large-scale solar systems typically requires multiple installation crews working at different installation locations. These installation locations may be separated by large distances which results in difficulty in managing construction materials, such as solar modules, and personnel that install these modules into the system. The installation of large-scale solar systems currently has limited ability to remotely monitor resources, materials and installation personnel at these locations and oftentimes requires managers to drive significant distances to a variety of different installation locations to identify the resources and materials at that location, the performance of the installation crew and the status of the installation process itself.

As previously described, solar modules and other components may be damaged during transit to an installation location or during an extended period of time as these materials sit prior to installation. Current processes have limited ability to prevent damage to materials, such as solar modules, and almost no ability to identify what caused the damage to resources. This lack of preventing damage and identifying the cause of damage results in a less efficient construction of the large-scale solar system as well as ambiguity on which party is liable for the damage.

What is needed are systems, devices and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

Figure 1:
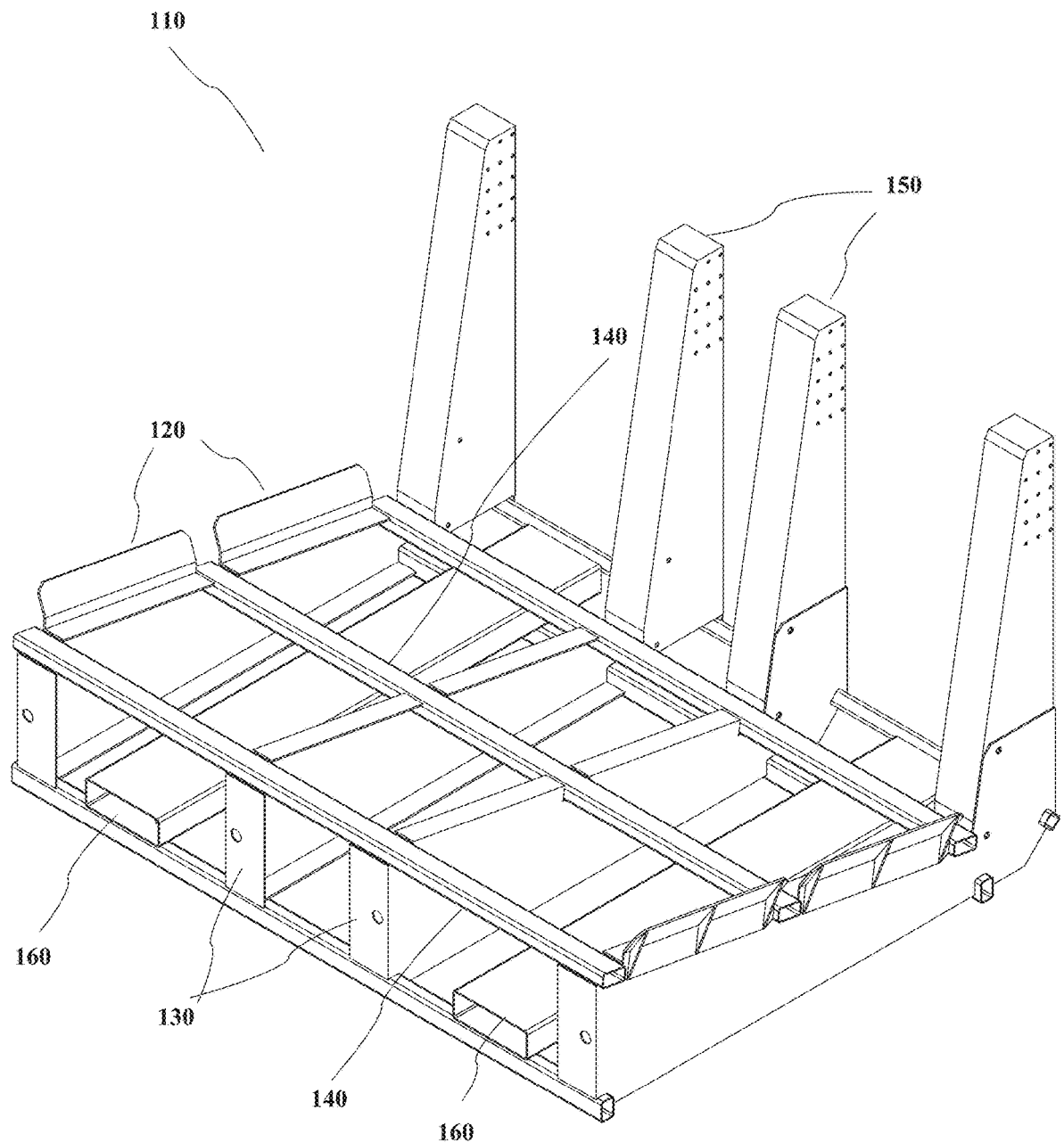
FIG. 1 shows a first view of a solar module crate transport structure according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of structures facilitating the transportation of assembled solar modules and subsequent integration within large-scale solar systems.

Furthermore, connectivity between components or systems within the figures are not intended to be limited to direct connections. Rather, connections between these components may be modified, or otherwise changed by intermediary components. Also, components may be integrated together or be discrete within the solar module crate transport.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different solar module crate transports; and (4) certain functions may be performed concurrently or in sequence.

Furthermore, it shall be noted that many embodiments described herein are given in the context of the assembly and installation of large numbers of solar modules within a system, but one skilled in the art shall recognize that the teachings of the present disclosure may apply to other large and complex construction sites in which solar modules are transported and installed within the system. Additionally, embodiments of a solar module crate transport may be implemented in smaller construction sites.

In this document, "large-scale solar system" refers to a solar system having 1000 or more solar panels. The term "solar module crate" refers to a package having at least four solar modules. A solar module crate may also contain other components or tools used in the installation of a solar module into the solar system. The term "solar module crate transport" is a structure on which a solar module crate is located and sufficiently secured to enable transportation to an installation location(s). The word "personnel" refers to any laborer, worker, designer or individual employed to construct or install a solar module or solar system. The term "crew" refers to multiple personnel working in proximity to each other in the construction of the solar system. The term "solar module" refers to a structural assembly comprising at least one solar panel and at least element used to install the module into the system. Examples of an element may be a rail, a torque tube, purlin or other attachment mechanism. The term "monitoring device" or "monitor" refers to a structural device (e.g., sensor, camera, location device such as GPS, RFID device, clock, wireless connectivity device such as WIFI or cellular transmitter, gyroscope, accelerometer, weight sensor, temperature sensor and a microcontroller(s) and/or embedded computer that supports one or more of these devices) that performs monitoring functions related to the solar module crate, the solar module crate transport, personnel information and analysis, and installation location information.

FIG. 1 is a perspective of a solar module crate transport according to various embodiments of the invention. The solar module crate transport 110 comprises an angled base on which a solar panel crate resides. This angled base comprises at least two horizontal supports 130 that define an angle on the base that results in a crate tilting backwards when it resides on the transport 110. One skilled in the art will recognize that other embodiments may comprise a different number of horizontal support structures 130 and that these structures may vary in shape and size. One advantage of this tilted base is that solar modules are less likely to fall of the transport when the modules are individually removed during an installation process and during subsequent storage on site. The titled base further enables an installation crew to un-crate and leave the uncrated solar modules in the field until the installation crew is ready to install the modules. Without the solar module crate transport, the solar modules of an uncrated stack of modules have to be installed or left on the vehicle (e.g., forklift). Essentially, this tilted base results in a slight backward force being applied to each of the solar modules so that when a solar module is removed from the front of the crate, other modules do not fall forward and become damaged. Various embodiments of the invention may have this tilt angle be between 5 degrees and 45 degrees.

The solar module crate transport 110 also comprises at least two vertical support structures 150 that are located at the back of the transport and coupled to the base of the device. In certain embodiments, the vertical support structure 150 are coupled to corresponding horizontal support structures 130 within the base. The number of vertical support structures 150 and the shape of each of the vertical support structures 150 may vary across different embodiments of the invention. In addition, the shape of each of the support structures 150 may be different between one or more of the vertical support structures 150. These vertical support structures 150 prevent a solar module crate from sliding off a backside of the transport as well as provide a structural buffer between the transport and vehicle used to move the crate to an installation location. The vertical support structures 150 should be sufficiently strong to support pressure applied from a crate as it resides on the angled base.

In certain embodiments, the base further comprises a plurality of rails 140 that are located above the horizontal support structures 130. These rails 140 provide additional support for the crate as it resides on the base of the transport 110. The base also comprises vehicle receptacles that enable a vehicle to lift and move the transport to an installation location. In this particular example, the transport 110 is lifted by a forklift and moved to a particular installation point. Forklift blade receptacles 160 are provided within the base to enable forklift blades to be inserted into each receptacle 160.

In certain embodiments, the base may also comprise a plurality of side guards that extent from one or more sides to further secure the crate to the transport 110. In this example, a first pair of side guards 120 are positioned on a first side of the transport 110 and a second pair of side guards 120 are positioned on a second side of the transport 110. A side guard vertically extends from a side of the transport 110 to further secure the crate when it resides on the base. One skilled in the art will recognize that the shape and size of a side guard may vary across different embodiments. Additionally, the number and location of side guards may also vary across different embodiments of the invention.

Figure 2:
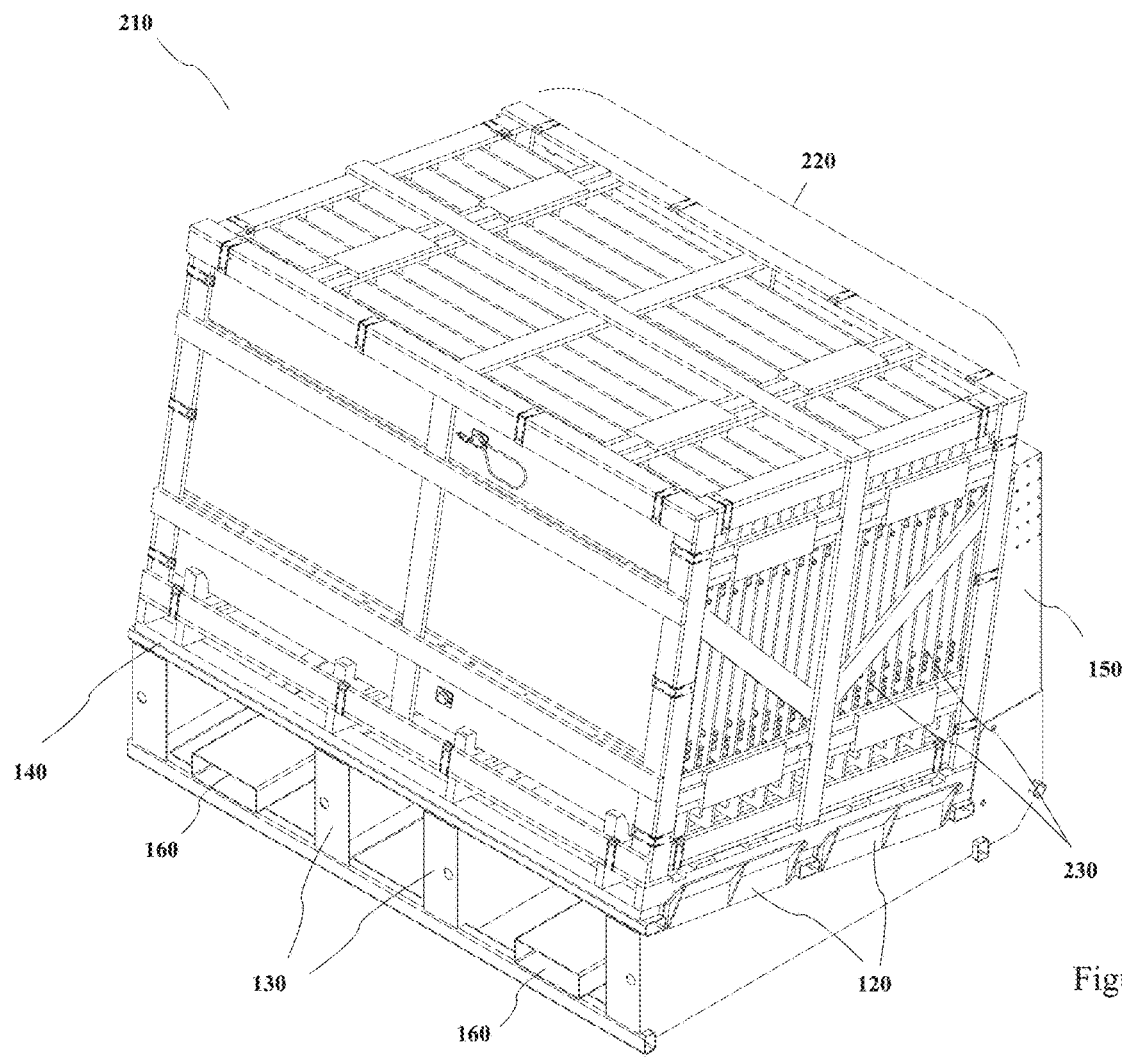
FIG. 2 shows a view of a solar module crate transport structure with a typical solar panel crate secured therein according to various embodiments of the invention.

FIG. 2 illustrates a solar module crate transport with a solar panel crate secured therein according to various embodiments of the invention. As shown, a solar module crate 220 is securely positioned within the transport 110 such that the combination 210 may be securely moved to an installation point. The solar module crate 220 comprises multiple solar modules 230 that may be individually removed from the crate at the installation location. One skilled will recognize that the tilt angle on the base from the horizontal support structures 130 results in each solar module 230 being tilted backwards to reduce the risk of solar modules falling out of the crate during removal.

Figure 3:
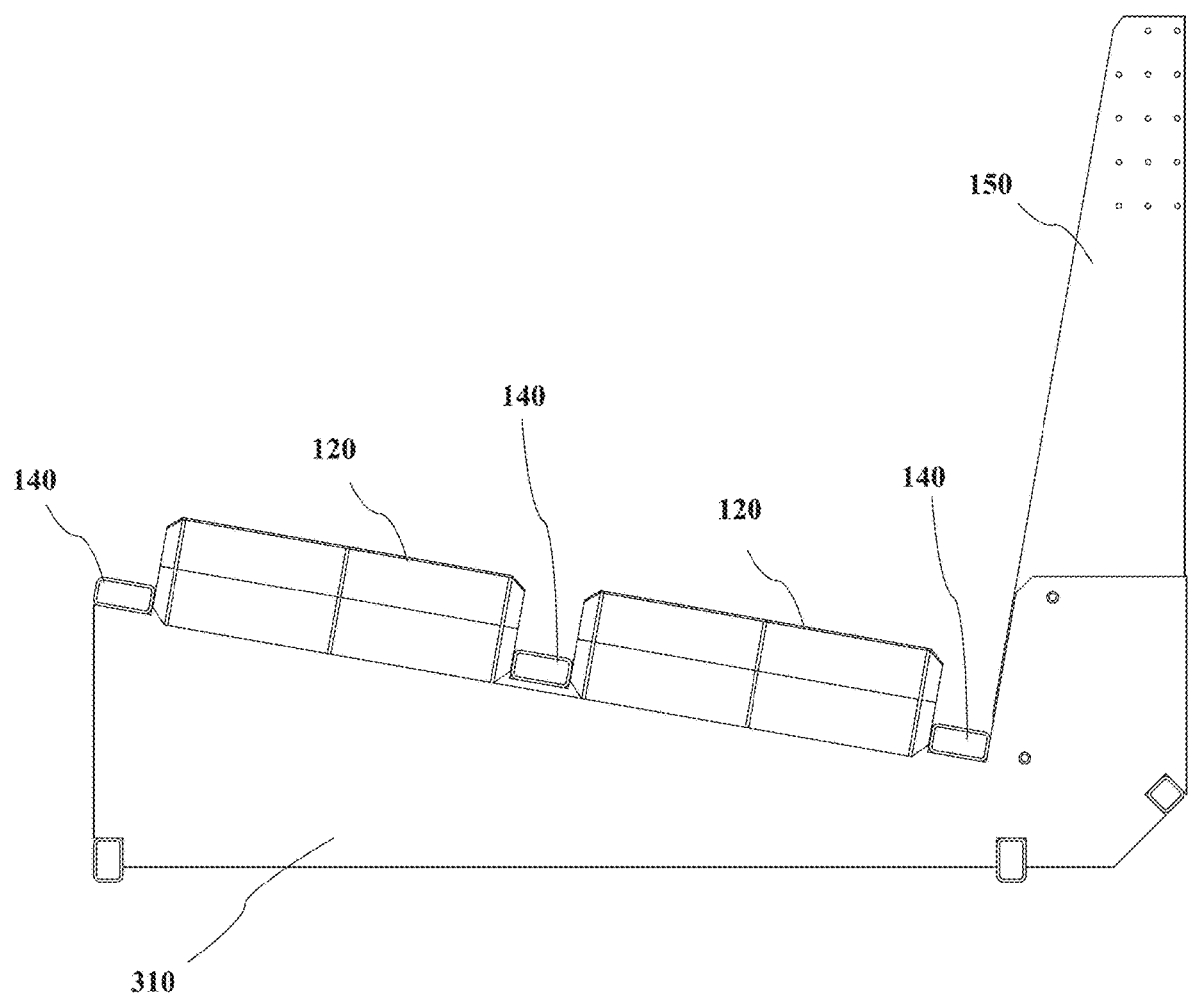
FIG. 3 shows a side view of a solar module crate transport structure according to various embodiments of the invention.

FIG. 3 shows a side view of a solar module crate transport according to various embodiments of the invention. In this embodiment, side guards 120 are positioned in between rails 140 to ensure at least a portion of the crate resides below the top of the side guard 120. Also, an exterior wall 310 of a horizontal support structure 130 is shown. As will be discussed in detail below, the transport 110 may provide a variety of different monitoring features that improve the movement and storage of solar modules within a large-scale solar system being constructed. Different sensors, cameras, location devices and wireless connectivity components may be positioned on the transport 110 including on vertical support structure(s) 150, the exterior wall 310 of a horizontal support structure 130 or on a front side of the transport 110.

Figure 4:
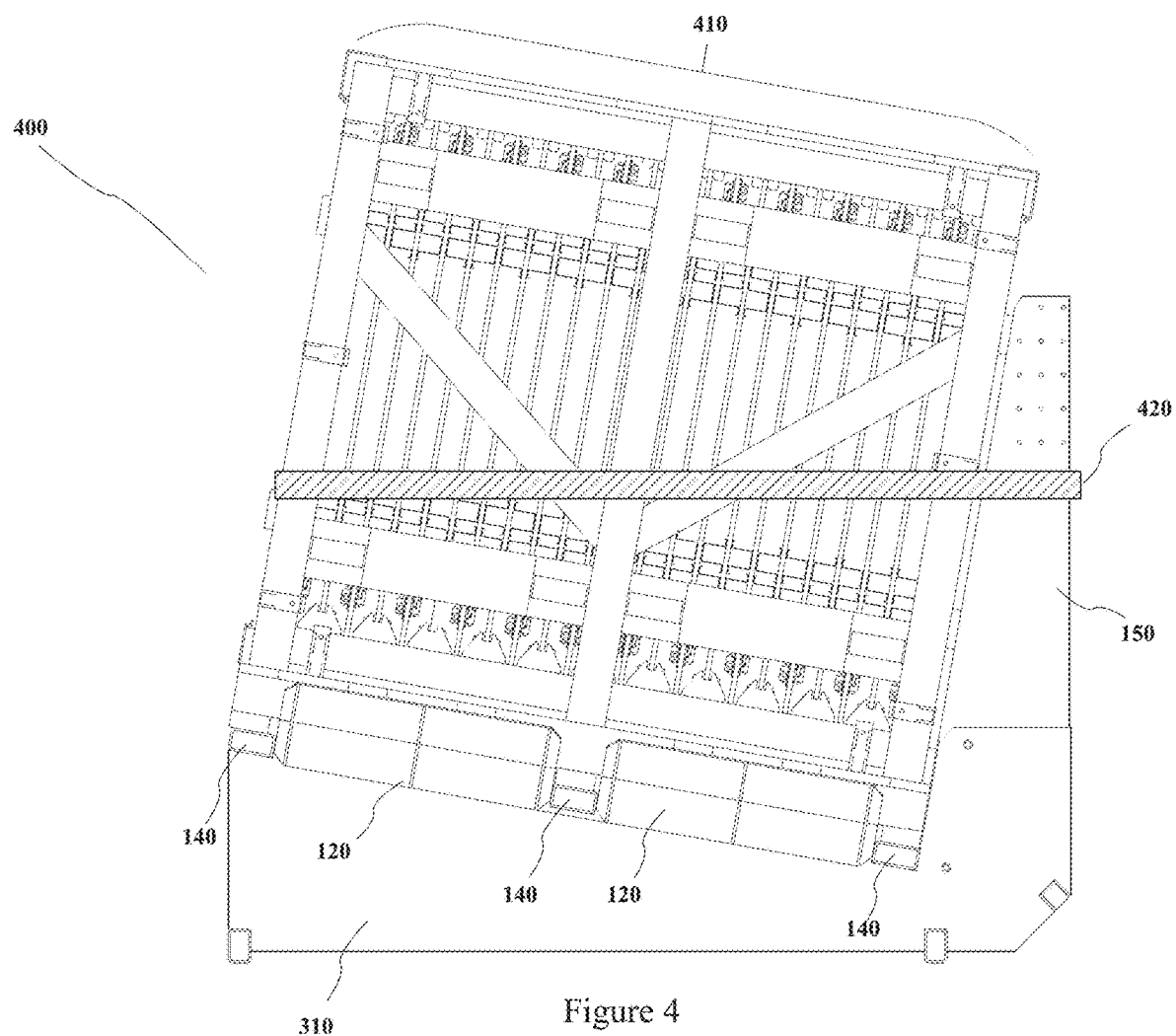
FIG. 4 shows a side view of a solar module crate transport structure with a typical solar module crate secured therein according to various embodiments of the invention.

FIG. 4 shows a side view of a solar module crate transport structure with a solar module crate secured therein according to various embodiments of the invention. A combination 400 of a solar module crate transport and a solar module crate 410 is shown to further illustrate structural and functional aspects according to certain embodiments. In certain examples, a strap 420 is provided to further secure the solar module crate 410 to the transport 110. The strap 420 extends around the solar module crate 410 and is secured to the vertical support structures 150 of the transport 110. In other embodiments, the strap 420 may be positioned vertically around the solar module crate 410 and the transport 110. In yet further embodiments, a vertical and horizontal strap may be used together.

Figure 5:
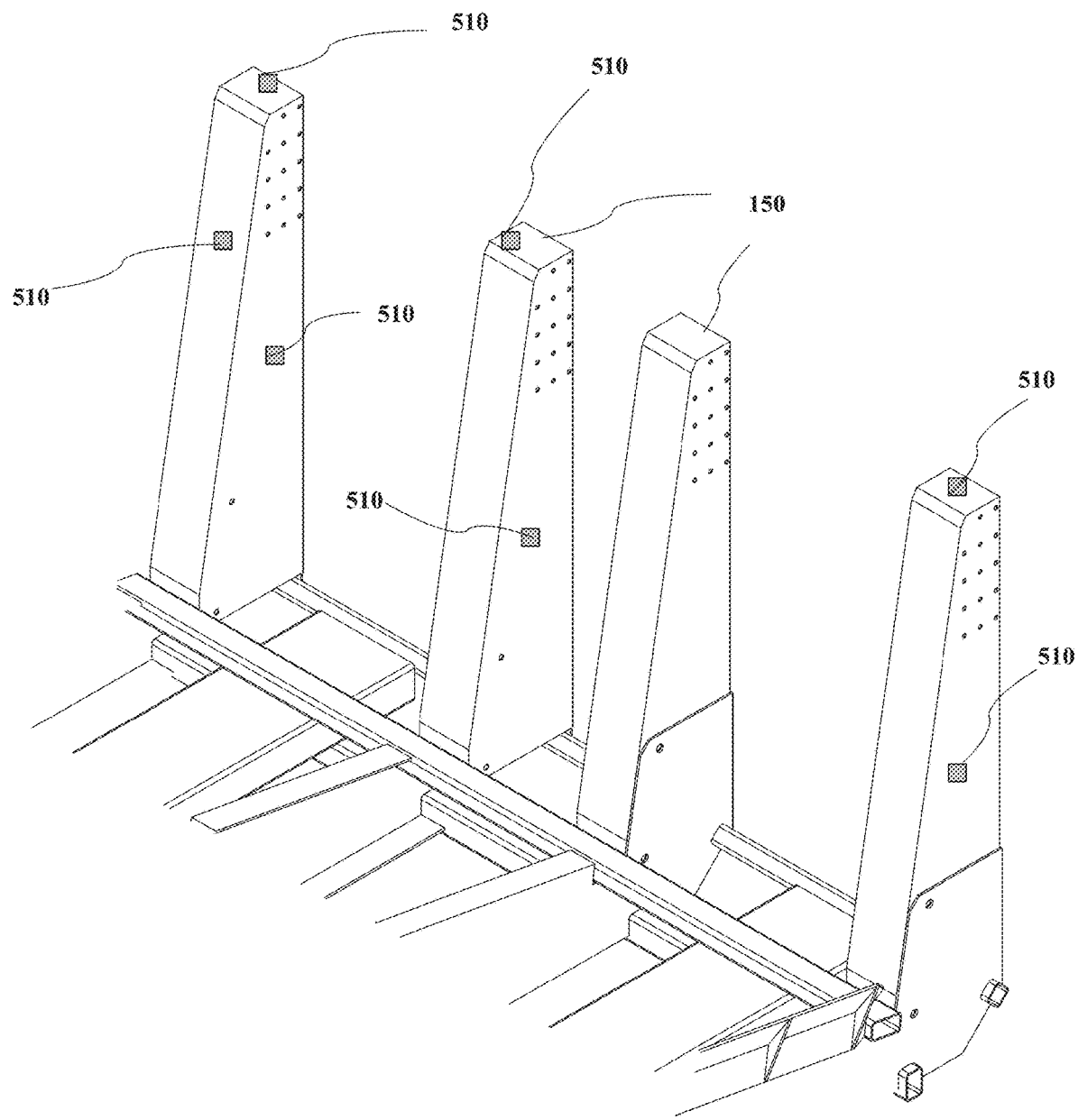
FIG. 5 shows exemplary vertical support pillars of a solar module crate transport structure having a variety of different sensors, cameras and other monitoring devices according to various embodiments of the invention.
Figure 6:
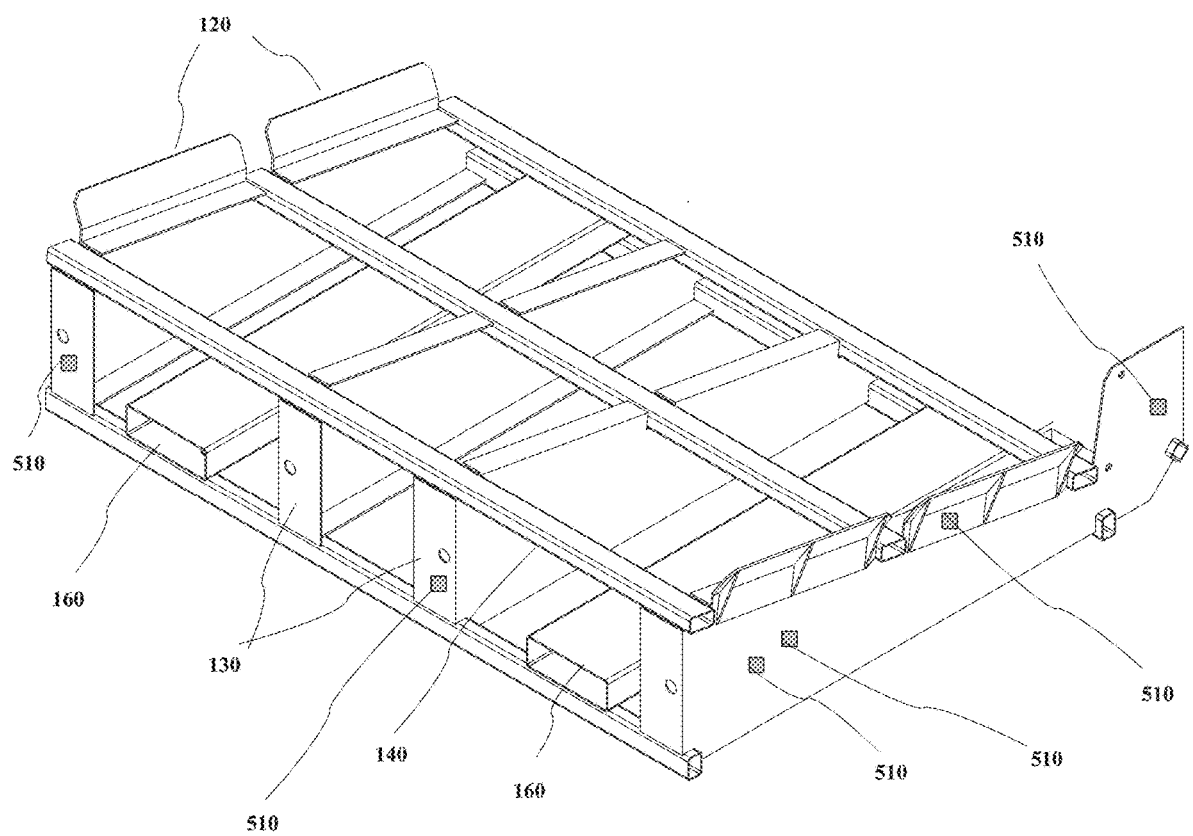
FIG. 6 shows an exemplary base of a solar module crate transport structure having a variety of different sensors, cameras and other monitoring devices according to various embodiments of the invention.

Embodiments of the invention may provide a variety of different monitoring features using monitoring devices on the solar module crate transport. These monitoring devices may be positioned anywhere on the transport 110 where corresponding monitoring functionality may be performed. FIG. 5 illustrates exemplary vertical support structures 150 where monitoring devices 510 may be located. FIG. 6 illustrates an exemplary base wherein monitoring devices 510 may be located. One skilled in the art will recognize that monitoring devices may be located in a variety of locations on a transport 110.

Various embodiments of the invention may integrate one or more monitoring devices 510 to implement a variety of features to enhance the transportation of solar module crates and other components, installation processes at an installation location and other functionality to improve the construction of a large-scale solar systems. The monitoring devices 510 may be discrete devices or integrated together in various combinations.

The solar module crate transport 110 may be supplemented with geo-location functionality that provides location information of the transport 110. In certain embodiments, a GPS device may be positioned on the transport 110 to intermittently transmit location information. In other embodiments, a cellular location device may be positioned on the transport to transmit this location information. A transport serial number or other identifier may also be transmitted with the location information to enable specific geo-tracking of transports and/or crates across a large-scale construction system. Location information may be time-stamped by an on-board clock so that a particular location may be associated with time information. This combination of location and time information will allow an entity to track the locations of a transport of an extended period of time for enhanced logistic monitoring.

The solar module crate transport 110 may be supplemented with load sensing information to track weight measurements of a solar module crate within a transport 110 over time. This weight information may be used for a variety of purposes including monitoring the number of solar modules located within a crate. This weight information may also be used to measure the efficiency of personnel within a crew in installing the modules within the solar system by comparing weight information relative to time information. Location and other time information may also be used to supplement weight measurements to improve visibility into the progress of the construction process and geopositioning of where specific modules are installed on the solar site.

The solar module crate transport 110 may also be supplemented with one or more cameras to provide remote viewing around the transport 110. This camera system provides visibility to a remote manager to see an installation location at which the transport is located or any other environment in which the transport resides. The camera device may be fixed, may be a 360-degree camera or may be remotely moveable to provide remote viewing by an individual. Image processing software may be employed to analyze images generated by the camera including identifying personnel around the transport or other objects proximate to the transport 110.

The solar module crate transport 110 may also be supplemented with a MEMs sensor(s) such as an accelerometer and/or gyroscope to measure shock to the transport 110. This shock measurement may be particularly relevant during movement of a solar module crate across rough terrain. A MEMs sensor may be able to detect an accident that occurs during transportation or reckless driving of a vehicle transporting the crate. These shock measurements may be supplemented by location and time information to enhance the visibility into events that may cause damage to a solar module(s). An analysis of shock information may allow a manager to identify improper driving or an accident during movement and also provide information about how and why damage occurred to a solar module.

The solar module crate transport 110 may be supplemented with optical sensor(s) to detect the amount of light around a transport 110. This light information may provide visibility into the weather and/or time of day at a particular installation location or environment around the transport 110.

The solar module crate transport 110 may be supplemented with a temperature sensor(s) that allow remote monitoring of temperature around the transport 110. In many instances, large-scale solar systems are deployed in very hot locations. Personnel and resources may be harmed if the temperature becomes too hot and temperature information may be used to automatically notify personnel of temperature dangers or notify a remote manager of a temperature event. In certain embodiments, temperature information may be compared to a threshold that identifies a temperature that presents potential danger to personnel or material. In response to a temperature threshold being crossed, an alarm may be triggered providing notice of the temperature danger to personnel proximate to the transport or a remote manager.

The solar module crate transport 110 may be supplemented with a motion detector that allows remote sensing of motion around the transport 110. This motion information allows remote monitoring of movement around the transport which may be indicative of personnel efficiency and work being performed. The motion information may be used as security information in the event the transport is left unattended at an installation location.

The solar module crate transport 110 may be supplemented with wireless personnel monitoring sensors that interface wirelessly with a remote device on personnel. This wireless personnel tracking information provides information on specific location of personnel, personnel activity and health, or other information that is provided to a remote device or manager. In certain instances, personnel may be provided a health monitor (e.g., a biometric wearable) that measures certain health characteristics such as heart rate, temperature, blood pressure, etc. to identify potential health problems at a remote installation location. This wireless personnel tracking information may also allow personnel to sound an alarm that is provided to a remote manager of an emergency. The wireless personnel tracking information may allow personnel to check-in and check-out during work hours or may be programmed to automatically provide chick-in and check-out information.

The solar module crate transport 110 may also be supplemented with an ultrasound sensor that provides ultrasound information to a remote monitoring location.

The solar module crate transport 110 may further be supplemented with an RFID tag that provides an identification number when activated by an RFID reader. The RFID tag will harvest energy from the reader and generate a wireless response in which the identification number is provided to the reader. In yet other embodiments, the solar module crate transport 110 may be supplemented with an embedded RFID reader that scan an RFID tag on a crate that is positioned within the transport 110. This RFID reader may be triggered to scan an RFID tag in response to a command from personnel or in response to a sensed weight change on the transport 110.

The solar module crate transport 110 may also be supplemented with sensors that enable driving assistance for a vehicle moving the crate to and from an installation location. These sensors may include collision warning that identify objects proximate to the sensor and notifies a driver of an impending collision. The sensors may also be used to assist in autonomous driving of the vehicle to and from the installation location. Additionally, the sensors may be fixed to the transport 110 or be coupled to the transport 110 in a way in which they may be secured to a vehicle. For example, cameras may be attached to the transport via a strap that allows the sensor to be secured to a vehicle moving the transport 110. Functionality such as backup assistance or forward-looking cameras may be provided to a driver. If a sensor or camera is to be secured to a vehicle, magnets or other attachment devices known to one of skill in the art may be used.

A variety of weather sensors (other than the temperature sensors discussed above) may be positioned on the solar module crate transport 110 such as wind sensors, UV sensors, and humidity sensors. These weather sensors allow remote monitoring of an installation location to ensure a safe environment is present when personnel are working. The weather sensors also allow weather tracking when a transport 110 is left unattended at an installation location.

The solar module crate transport 110 may be supplemented with various wireless communication devices that support different types of wireless communication between installation locations and/or remote monitoring locations. In certain embodiments, wireless communication devices may be used across multiple transports to effectively build a wireless mesh network that enables communication across a large-scale solar system. In other embodiments, small cell base stations may be supported that use cellular technology to facilitate wireless communication between installation locations and/or remote monitoring locations.

One skilled in the art will recognize that the various monitoring devices and corresponding functionality may be combined in numerous ways to build monitoring programs and features to improve efficiency at installation locations, improve personnel monitoring including work efficiency and health, provide remote visibility into a variety of locations within the system and allow communication between installation locations.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A solar module crate transport comprising:
   a base that supports a solar module crate during transportation, the base having a tilt angle defined by at least two horizontal support structures, the tilt angle causing a plurality of solar modules within the solar module crate to tilt backwards;
   at least two vertical support structures coupled to the base, the at least two vertical support structures providing vertical support on which the solar module crate is positioned;
   at least one vehicle receptacle coupled within the base, the at least one vehicle receptacle facilitates a vehicle to lift and move the solar module transport; and
   at least one monitor device coupled within the solar module crate transport, the at least one monitor device providing monitoring functionality to a location remote to the solar module crate transport, the at least one monitoring device comprises a load detector that generates load information to track weight measurements of the solar module crate, the load information is used to approximate a number of solar modules within the solar module crate transport.

2. The solar module crate transport of claim 1 wherein the at least one vehicle receptacle comprises a plurality of forklift blade receptacles.

3. The solar module crate transport of claim 1 wherein tilt angle is between 2 degrees and 30 degrees.

4. The solar module crate transport of claim 1 wherein the base further comprises a plurality of side guards.

5. The solar module crate transport of claim 4 wherein the plurality of side guards comprise at least one first side guard positioned on a first side of the solar module crate transport and at least one second side guard positioned on a second side of the solar module crate transport, the first and second sides being opposite to each other.

6. The solar module crate transport of claim 1 wherein the base further comprises a plurality of rails that support the solar module crate.

7. The solar module crate transport of claim 1 wherein the at least one monitoring device comprises a location sensor that generates location information associated with the solar module crate transport.

8. The solar module crate transport of claim 7 wherein the location sensor is a GPS location sensor.

9. The solar module crate transport of claim 1 wherein the at least one monitoring device comprises a camera that generates images of an environment around the solar module crate transport.

10. The solar module crate transport of claim 9 wherein the images are processed to identify at least one personnel proximate to the solar module crate transport.

11. The solar module crate transport of claim 1 wherein the at least one monitoring device comprises a temperature sensor that generates temperature information.

12. The solar module crate transport of claim 11 wherein the temperature information is analyzed relative to a threshold and an alarm is generated if a temperature level crosses the threshold.

13. The solar module crate transport of claim 1 wherein the at least one monitoring device comprises a MEMs sensor that generates shock information associated with movement of the solar module crate transport.

14. The solar module crate transport of claim 13 wherein the MEMs sensor is an accelerometer.

15. The solar module crate transport of claim 1 wherein the at least one monitoring device comprises a weather sensor that generates weather information associated with a location of the solar module crate transport.

16. The solar module crate transport of claim 1 wherein the at least one monitoring device comprises a first wireless device that provides wireless connectivity from the solar module crate transport to a second remote wireless device.

17. The solar module crate transport of claim 16 wherein the second remote wireless device is positioned on another solar module crate transport.

18. The solar module crate transport of claim 16 wherein the first wireless device is located within a wireless mesh network.

19. The solar module crate transport of claim 16 wherein the first wireless device is a cellular device.

20. The solar module crate transport of claim 1 wherein the at least one monitoring device comprises an RFID tag to identify the solar module crate.

21. The solar module crate transport of claim 1 wherein the at least one monitoring device comprises an RFID reader that reads information from an RFID tag on a crate positioned on the solar module crate transport.

22. A solar module crate transport comprising:
a base that supports a solar module crate during transportation, the base having a tilt angle defined by at least two horizontal support structures, the tilt angle causing a plurality of solar modules within the solar module crate to tilt backwards;
at least two vertical support structures coupled to the base, the at least two vertical support structures providing vertical support on which the solar module crate is positioned;
a load detector that generates load information to track weight measurements of the solar module crate, the load information is used to approximate a number of solar modules within the solar module crate transport; and
at least one vehicle receptacle coupled within the base, the at least one vehicle receptacle facilitates a vehicle to lift and move the solar module transport.

* * * * *